United States Patent Office 3,226,451
Patented Dec. 28, 1965

3,226,451
UNSATURATED POLYESTER RESIN RESULTING FROM THE COPOLYMERIZATION OF AN UNSATURATED POLYESTER AND A POLYALLYL ETHER, AND PROCESS FOR PREPARING SAME
Robert Béhar, Boulogne-sur-Seine, and André Daniel Cahn, Marcel Dubien, and Robert Antoine Marie Aussedat, Paris, France, assignors to Societe Francaise Duco, Paris, France, a French body corporate
No Drawing. Filed Jan. 8, 1963, Ser. No. 250,000
Claims priority, application Great Britain, May 1, 1959, 14,922/59
8 Claims. (Cl. 260—861)

This application is a continuation-in-part of abandoned application Serial Number 25,560 filed April 29, 1960.

The present invention concerns unsaturated polyester resins hardening readily in air.

Unsaturated polyester resins resulting from the esterification of mixtures in various proportions of unsaturated polycarboxylic acids and saturated polycarboxylic acids with saturated or unsaturated polyhydric alcohols or their mixtures are already known. Among the acids normally used, maleic acid or anhydride, fumaric, itaconic etc. acids mixed or not with saturated polycarboxylic acids such as phthalic, adipic, etc. acids may be mentioned. Among the polyhydric alcohols may be mentioned ethylene glycol, diethylene glycol, propylene glycol, the butane diols etc. When such polyesters are dissolved in certain unsaturated solvent monomers such as the vinyl, allyl, methallyl, etc., esters, styrene and vinyl toluene, in certain conditions and in the presence of certain catalysts, copolymerization is produced with these monomers to give hard and transparent materials applicable in numerous fields such as in particular that of paints and varnishes, laminated articles etc. The catalysts generally used are composed of organic peroxides applied either in conjunction or not with certain metallic salts or certain tertiary amines.

It is, however, well known that this copolymerization is retarded or even prevented at ordinary temperature by the presence of the oxygen in air.

In order to prevent this phenomenon a certain number of processes both mechanical and chemical have been recommended.

Thus according to one of these processes, the surface of the article covered with the resin is protected from the action of air during the hardening phase; according to a variation, after the moulding of the article, that part of the resin which has not hardened is removed by abrasion or by planing. These physical or mechanical processes are, however, difficult to put into operation particularly if the form of the article is complicated or if the surface area is large.

Among the recommended chemical processes may be mentioned in particular those which give unsaturated polyester compositions obtained by esterification of part of the carboxyl groups of the polycarboxylic acids by a beta gamma unsaturated ether containing one or more free hydroxyl groups or by esterification of part of the hydroxyl groups of the polyhydric alcohols by a beta gamma unsaturated ether having one or more carboxyl groups.

There are also processes which lead to a polyester composition composed essentially of a simple mixture of a polyester and a beta gamma unsaturated ether without the ether being reacted with the polyester.

In the former case of polyesterification, resins are obtained which have a marked tendency to gel and on account of this fact, their preparation is a very delicate operation. In the case of the mixture referred to above, if the danger of gelling is eliminated, the quality of the resins obtained is inferior both from the point of view of rapidity of drying and the hardness of the coatings or the beauty of the gloss. This fact is not at all surprising since there is no longer a chemical combination but a physical mixture of two constituents. The present invention provides an improved process for preparing an unsaturated polyester resin without the above drawbacks.

This process comprises heating a mixture of at least one acidic reactant selected from the group consisting of polycarboxylic acids and anhydrides thereof and at least one polyhydric alcohol reactant, one at least of these reactants being ethylenically unsaturated, so as to obtain an unsaturated polyester, in the presence of a hydroxyl-free polyallyl ether of a polyglycerol, thereby obtaining simultaneously a copolymerization between the polyallyl ether and the unsaturated polyester.

The reaction mixture preferably contains stoichiometrical quantities of polycarboxylic acid and polyhydric alcohol and from 10 to 45% by weight of the polyallyl ether.

It has in effect been found that it was possible to combine the constituents of a linear unsaturated polyester with a hydroxyl-free polyallyl ether of a polyglycerol. This combination is effected by copolymerization between the unsaturated constituents of the reaction by opening certain double bonds of the reactants. In other words the polyallyl ether is copolymerized through its unsaturated groups with for example a molecule of a polyester possibly formed previously in the reaction, or with an unsaturated polycarboxylic acid or an unsaturated polyhydric alcohol before the formation of the polyester, or at the same time as the esterification is effected.

The danger of gelling is thus greatly reduced due to the fact that the esterification reaction is practically complete between the polycarboxylic acid and polyhydric alcohol used in stoichiometrical proportions.

According to the invention and owing to the specific type of polyallyl ether copolymerized with the unsaturated polyester an improved unsaturated polyester resin is obtained, the drying properties of which at ordinary temperature both in the presence and in the absence of air are particularly noteworthy. This polyester resin is used, like prior art polyesters, in solution in an unsaturated monomer to which is added, at the moment of use, a catalyst and an accelerator.

Among the polyallyl ethers which can be used in accordance with the invention, we may mention in particular the hydroxyl-free polyallyl ethers of di, tri, tetra and penta glycerol. These ethers may be represented by the following general formula:

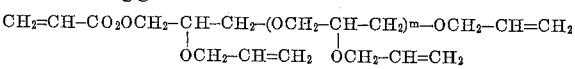

in which $m$ is an integer from 1 to 4.

These polyethers can conveniently be obtained from the above-mentioned polyglycerols and allyl alcohol or allyl chloride.

Other advantages and characteristics of the invention will appear more clearly from the following examples given by way of explanation and in no way being limitative.

*Example I*

447 parts by weight of maleic anhydride, 299 parts by weight of phthalic anhydride and 507 parts by weight of propanediol 1-2 are mixed. 390 parts of hexaallyl tetraglycerols are added and the temperature is raised progressively to 195–200° C. in the presence of toluene as the agent of azeotropic distillation to eliminate the condensation water. When the acid number of the reactive mass reaches 50, the solvent is driven off. The polyester cooled to 100° is treated with 0.2% hydroquinone and dissolved in styrene to form a 65% solution. The solution is clear with a viscosity between R and S on the Gardner-Holdt scale.

To 88 parts of the resin thus prepared 4 parts are added of a solution of cobalt naphthenate with 1.5% Co in styrene and 6% ethyl acetate. Shortly before use 20 parts are added of a 10% solution of methyl ethyl ketone peroxide in dibutyl phthalate. Applied in a layer of approximately 250 microns on to a wooden surface at ordinary temperature, the resin gives a coating which dries to a dust-free condition in 1 hour and which can be polished 4 hours after application. This coating has a very good gloss and enhances the grain of the wood on which it is applied.

For comparison purposes, this example is exactly repeated except that hexaallyl-tetraglycerol is replaced by an equal weight of the triallyl ether of monoglycerol, that is: 1,2,3-tris alpha allyl ether of propane. Due to this substitution, the dust-free drying time of the coating applied to the wooden surface increases from 1 hour to 10 hours and the time necessary for enabling the coating to be polished from 4 hours to 24 hours.

This clearly illustrates the important improvement due to the use according to the invention of a polyallyl ether of a polyglycerol.

*Example II*

For a preparation in every other respect identical to the one described in Example I, instead of hexa-allyl tetraglycerol there is used in two separate experiments an equal weight of (A) a more complex mixture consisting of one part of tetraallyl diglycerol, 2 parts of pentaallyl triglycerol, 2 parts of hexaallyl tetraglycerol and 5 parts of heptaallyl pentaglycerol, and (B) tetraallyl diglycerol.

The resins obtained, treated with accelerator and catalyst identical in quantity and in nature with those described in Example I, are applied with a spray gun to a wooden panel. Resin A dries to a glossy film in the space of one hour. This film may, if necessary, be rubbed down and polished a few hours later. Resin B dries to a dust-free coating in 2 hours and the coating can be polished after 10 hours.

*Example III*

In 4 parts of the resin described in Example I, 15 parts of rutile titanium dioxide are ground after adding 3 parts of ethyl acetate. When the required fineness is obtained it is made up with 66 parts of the same resin and 3.5 parts of accelerator formed by a solution of cobalt naphthenate in styrene containing 1.5% Co. Shortly before the application 20% of solution of methyl ethyl ketone peroxide in dibutyl phthalate are added.

A lacquer of this kind applied with a spray gun on a metal base or wooden base to a thickness of approximately 250 microns gives a film with a good gloss which dries to a dust-free condition at ordinary temperature in 45 minutes and hardens in 5 hours.

Having now described our invention what we claim as new and desire to secure by Letters Patent is:

1. Process for preparing an unsaturated polyester resin hardening readily in air at room temperature, comprising heating a mixture of a polyallyl ether of a polyglycerol and at least one acidic reactant selected from the group consisting of polycarboxylic acids and anhydrides thereof and at least one polyhydric alcohol reactant, one at least of these reactants being ethylenically unsaturated, so as to obtain an unsaturated polyester, said polyallyl ether of a polyglycerol having the following formula:

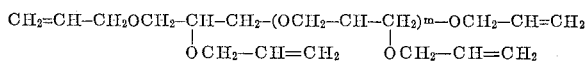

in which $m$ is an integer from 1 to 4, thereby obtaining a copolymerization between the polyallyl ether and the unsaturated polyester.

2. Process as claimed in claim 1, wherein the reaction mixture contains substantially stoichiometrical quantities of polycarboxylic acid and polyhydric alcohol and from 10 to 45% by weight of unsaturated polyallyl ether.

3. Process as claimed in claim 1, wherein the heating is effected in the presence of a solvent forming an azeotropic mixture with the water liberated during the reaction.

4. Process as claimed in claim 1, wherein said polyallyl ether is hexaallyl tetraglycerol.

5. Process as claimed in claim 1, wherein said polyallyl ether is a mixture of tetraallyl diglycerol, pentaallyl triglycerol, hexaallyl tetraglycerol and heptaallyl pentaglycerol.

6. An unsaturated polyester resin hardening readily in air at room temperature, comprising the copolymerization product of 90 to 55% by weight of the thermal esterification product of a substantially stoichiometrical mixture of at least one acidic reactant selected from the group consisting of polycarboxylic acids and anhydrides thereof and at least one polyhydric alcohol reactant, one at lease of these reactants being ethylenically unsaturated, with 10 to 45% by weight of a polyallyl ether of a polyglycerol of formula:

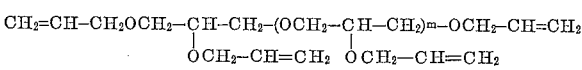

in which $m$ is an integer from 1 to 4.

7. An unsaturated polyester resin as claimed in claim 6, comprising the thermal esterification product of maleic anhydride, phthalic anhydride and propanediol 1-2, simultaneously copolymerized with hexaallyl tetraglycerol.

8. An unsaturated polyester resin as claimed in claim 6, comprising the thermal esterification product of maleic anhydride, phthalic anhydride and propanediol 1-2, simultaneously copolymerized with a mixture of tetraallyl diglycerol, pentaallyl triglycerol, hexaallyl tetraglycerol and heptaallyl pentaglycerol.

References Cited by the Examiner

UNITED STATES PATENTS 2,595,625  5/1952  Agnew _____ 260—861
2,852,487  9/1958  Maker _____ 260—861

FOREIGN PATENTS 1,019,421  11/1957  Germany.

MURRAY TILLMAN, *Primary Examiner.*

J. T. GOOLKASIAN, *Assistant Examiner.*